June 6, 1933.     C. W. STROBELL     1,913,011
ORNITHOPTER WING STRUCTURE
Filed Aug. 23, 1932
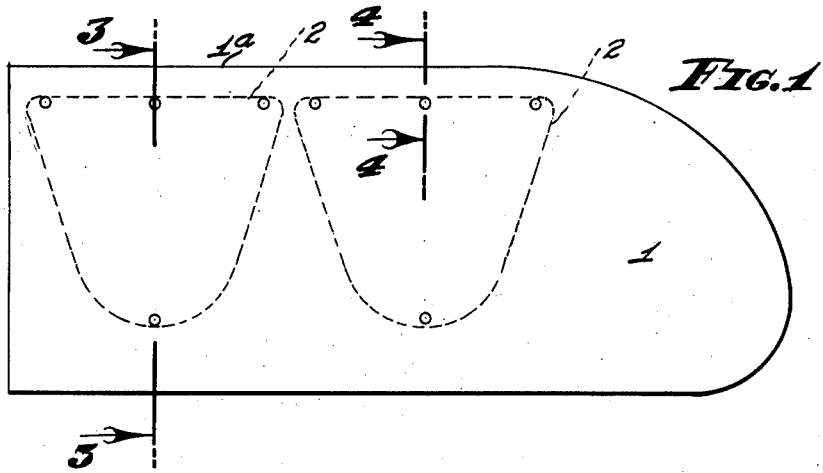
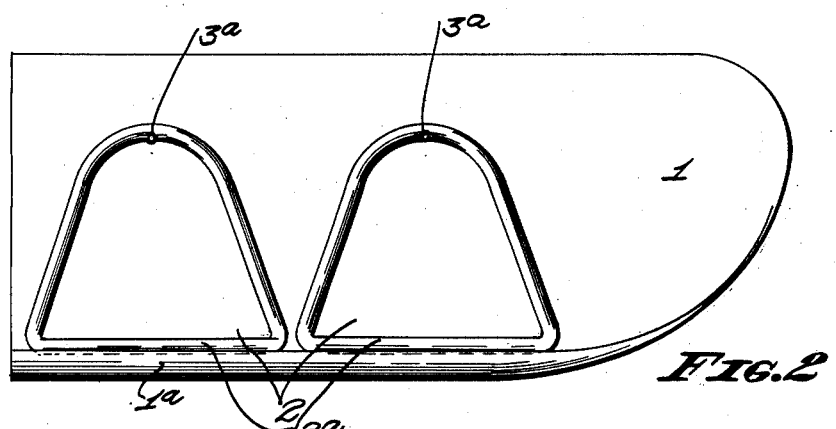
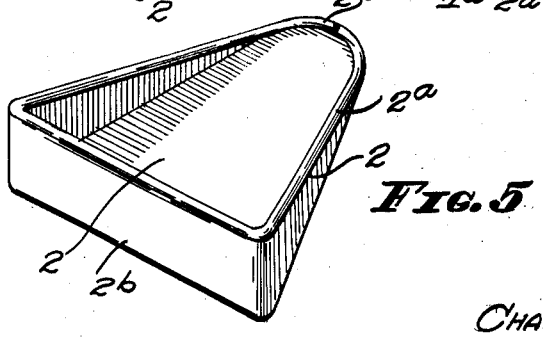
Inventor
CHARLES WILLIAM STROBELL
By A. B. Bowman
Attorney Patented June 6, 1933

1,913,011

UNITED STATES PATENT OFFICE

CHARLES WILLIAM STROBELL, OF SAN DIEGO, CALIFORNIA

ORNITHOPTER WING STRUCTURE

Application filed August 23, 1932. Serial No. 630,037.

My invention relates to wing structures for ornithopters, and the objects of my invention are:

First, to provide a wing structure for ornithopters in which the air receiving portion is slightly expandible during the downward stroke of the wing and contractible during the upward stroke of the wing, thus providing great efficiency;

Second, to provide a portion of a wing structure of this class in which the material is elastic and tends to expand under pressure and contract when the pressure is released;

Third, to provide a wing portion of this class which may be built into the wing structure or may be attached thereto so that it may be readily detached therefrom;

Fourth, to provide a wing portion of this class in which one or more separate elastic expandible sections may be incorporated in each wing as desired;

Fifth, to provide a wing structure of this class in which the main air engaging portion tends to receive a large amount of air during the downward stroke and release it past the back edge of the wing tending to force the plane to which the wing is attached to go forward in an efficient manner;

Sixth, to provide a combined wing structure and combined expandible member in relation thereto in which the wing structure body forms a reinforcement against too much expansion of the expandible member upon the downward stroke of the wing, and Seventh, to provide a wing structure for ornithopters of this class which is very simple and economical of construction, durable, efficient in its action, easily repaired and replaced and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a top or plan view of an ornithopter wing section showing the expansible air engaging portions by dotted lines on the underside; Fig. 2 is a similar view of the wing upsidedown; Fig. 3 is a sectional view through 3—3 of Fig. 1; Fig. 4 is an enlarged sectional view through 4—4 of Fig. 1, and Fig. 5 is a perspective view of the air pocket expandible member which is attached to the lower side of the wing structure.

Similar characters of reference refer to similar parts and portions throughout the several views of the drawing.

The main wing member 1, expansible pocket member 2, and attachment bolts 3, constitute the principal parts and portions of my ornithopter wing structure.

The wing member 1 may be of any shape or form where the lower side is approximately concave and the upper side convex. In this case I have shown an ordinary type of wing structure concavo-convex in form with a rounded leading edge and a fin edged trailing edge, shown best in Fig. 3 of the drawing, and with curved tips. Mounted in the concave lower side of the wing 1 is provided one or more pocket members 2 which are relatively broad and deep at the leading side and gradually taper to a thin edge at the trailing side, decreasing also in width toward the trailing side, as shown in the drawing. This is made up of elastic material such as rubber and provided with reinforcing rods $2a$ and $2b$ forming a frame for the rubber shaped pocket 2, as shown best in Fig. 5 of the drawing. It being noted that these members merge together at the back side so that the air will readily pass out through the back side and past the trailing edge of the wing.

With the particular wing structure shown the lower rod member $2a$ extends down to flush with the lower curved surface $1a$ of the wing 1 and the rubber passes over this at the front side at nearly an upright direction over the rod $2b$, thence backwardly to the rod $2c$ at the back side so that the rubber 2 between the rods 2b and 2c is stretched slightly and is adapted to expand up against the inner surface of the member 1 upon the downward stroke of the wing, as shown by dotted lines, and when the wing has its upward stroke it extends slightly downwardly as shown by dotted lines in Fig. 3. These rods are preferably secured in position by means of bolts 3 which are countersunk in the surface of the member 1 and extend inwardly through the rods 2b and 2c and on the inner end are provided wing nuts 3a so that these pocket members may be readily removed and replaced, and let it here be noted that one or more of these pocket members may be used in each wing structure, the drawing showing two.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by letters Patent is:

1. In a wing structure for ornithopters, a pocket member formed of an elastic expandible material secured with its open side down on the lower side of the wing structure.

2. In a wing structure for ornithopters, a pocket member formed of an elastic expandible material secured with its open side down on the lower side of the wing structure, said pocket member being relatively deep at its leading side and relatively shallow at its trailing side.

3. In a wing structure for ornithopters, a pocket member formed of an elastic expandible material secured with its open side down on the lower side of the wing structure, said pocket member being relatively deep at its leading side and relatively shallow at its trailing side, and means for detachably securing said pocket member in the lower side of the wing.

4. In an ornithopter wing structure, a rigid concavo-convex wing member and a pocket member with a relatively deep leading edge and a relatively shallow trailing edge and the side walls diverging backwardly formed of elastic expansible material secured in the concave side of said wing structure with its wide deep side at the leading side of said wing structure.

5. In an ornithopter wing structure, a rigid concavo-convex wing member and a pocket member with a relatively deep leading edge and a relatively shallow trailing edge and the side walls diverging backwardly secured in the concave side of said wing structure with its wide deep side at the leading side of said wing structure.

6. In an ornithopter wing structure, a rigid concavo-convex wing member and a pocket member with a relatively deep leading edge and a relatively shallow trailing edge and the side walls diverging backwardly formed of elastic expansible material secured in the concave side of said wing structure with its wide deep side at the leading side of said wing structure, and reinforcing frame structure at the upper and lower sides converging at the back side of said pocket member.

7. In an ornithopter wing structure, a rigid concavo-convex wing member and a pocket member with a relatively deep leading edge and a relatively shallow trailing edge and the side walls diverging backwardly formed of elastic expansible material secured in the concave side of said wing structure with its wide deep side at the leading side of said wing structure, reinforcing frame structure at the upper and lower sides converging at the back side of said pocket member, and means for readily attaching and detaching said pocket from said wing structure.

In testimony whereof, I have hereunto set my hand at San Diego, California, this 10th day of August, 1932.

CHARLES WILLIAM STROBELL.